United States Patent

[11] 3,561,468

| [72] | Inventor | Harry Sugden, Jr., Statesboro, Ga. |
|---|---|---|
| [21] | Appl. No. | 768,834 |
| [22] | Filed | Oct. 18, 1968 |
| [45] | Patented | Feb. 9, 1971 |
| [73] | Assignee | Emerson Electric Co., St. Louis, Mo. a corporation of Missouri |

[54] UNIVERSAL CONTROL VALVE
11 Claims, 8 Drawing Figs.

[52] U.S. Cl. .................................................... 137/269, 137/270
[51] Int. Cl. ................................................... F16k 51/00
[50] Field of Search.......................................... 137/269, 271, 505.18, 510, 270

[56] References Cited
UNITED STATES PATENTS

| 687,002 | 11/1901 | Cash............................ | 137/269X |
| 1,567,030 | 12/1925 | Bryant........................ | 137/271 |
| 2,399,111 | 4/1946 | George....................... | 137/269X |
| 2,982,297 | 5/1961 | Modes........................ | 137/271 |
| 3,001,550 | 9/1961 | Engel.......................... | 137/505.18X |

*Primary Examiner*—Cary M. Nelson
*Assistant Examiner*—R. B. Rothman
*Attorney*—Strauch, Nolan, Neale, Nies & Kurz ABSTRACT: A universal control valve capable of performing several different control functions including those of a pressure reducing valve, a relief valve, and/or a normally open or normally closed pressure differential control valve. The respective control functions are accomplished merely by reassembling the valve components in various possible structural arrangements. The valve may also be used as a pilot valve causing a larger main valve to perform the same control functions as that provided by its own structural assemblage.

3,561,468

PATENTED FEB 9 1971

INVENTOR.
HARRY SUGDEN, JR.
BY Strauch, Nolan, Neale, Nies & Kurz
ATTORNEYS

INVENTOR.
HARRY SUGDEN, JR.
BY Strauch, Nolan, Neale, Nies & Kurz
ATTORNEYS 3,561,468

UNIVERSAL CONTROL VALVE

BACKGROUND OF THE INVENTION

This invention relates generally to valve constructions and more particularly to a novel universal valve capable of performing several different and unique control functions merely by assembling the valve in one of several different possible assembly configurations.

In the past, it has generally been the practice to manufacture and produce valves capable of performing only a single desired fluid control function such as a pressure-reducing control function, a relief or back pressure control, and/or a normally open or normally closed differential control function. Since each valve provided only one of such control functions, a variety of different type valves had to be manufactured and supplied for the purpose of accomplishing all the desired or required control functions.

Because conventional valves are ordinarily suitable for only a single type of pressure control function, manufacturers, suppliers, and contractors have found it necessary to produce and stock a wide variety of different type of valves which of course presents manufacturing and inventory problems and increases cost of operation.

SUMMARY OF THE INVENTION

Accordingly, the primary object of this invention is to provide a novel universal valve capable of performing several different and unique control functions merely by assembling the valve in one of several different possible assembly configurations.

Another object is to provide a novel universal control valve which may act as a pressure-reducing valve, a back pressure or relief valve, or a normally open or normally closed differential control valve.

Still another object is to provide a novel universal control valve as in the above objects and capable of acting as a pilot valve associated with a standard pilot-operated main valve, the latter of which will perform whatever function the novel universal pilot valve tells it to perform.

A further object resides in the provision of a novel universal control valve capable of performing several different control functions and comprising a number of basic parts which can be readily reassembled into various configurations in which they perform a different control function without requiring any additional parts or any specialized working tools.

Additional objects and advantages of the invention will become apparent from a reading of the following detailed description of the preferred embodiments and from the appended claims.

DETAILED DESCRIPTION OF THE PREFERRED EMBODIMENTS

Figure 1:
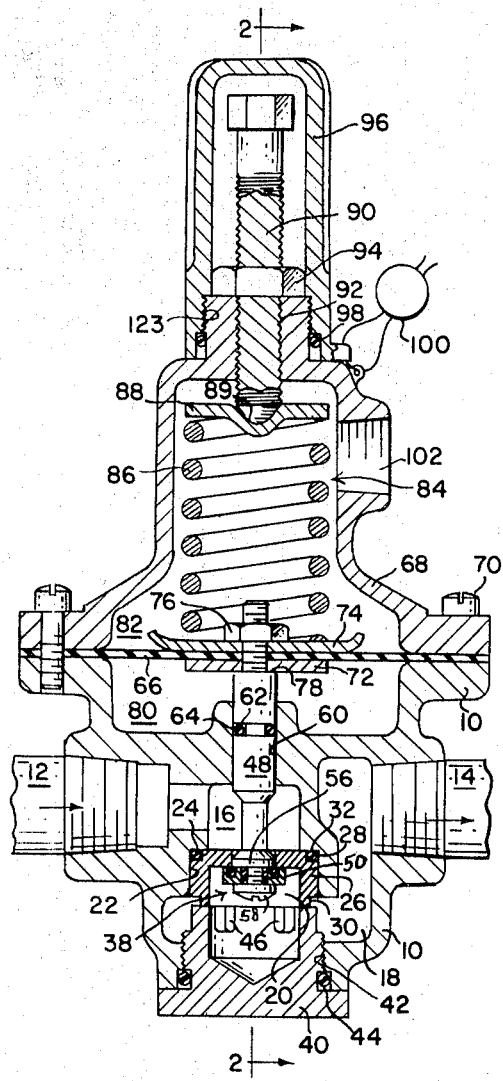
FIG. 1 is a partially sectioned elevation view of the universal valve of the invention with the valve closure member and seat components arranged to provide a pressure reducing control function.
Figure 4:
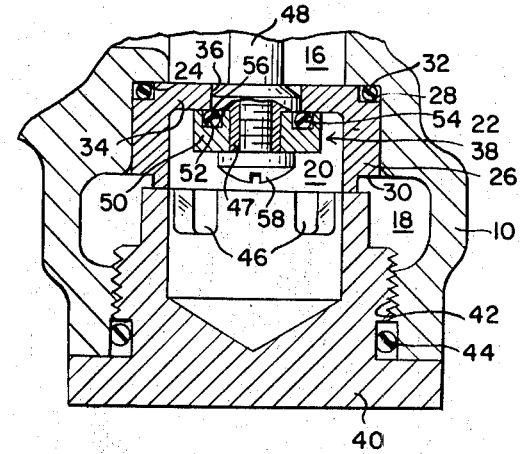
FIG. 4 is an enlarged fragmentary sectional view of the reversible closure member assembly and reversible valve seat arranged as in FIGS. 1—3 to provide a pressure reducing control function.

Referring now to FIGS. 1 and 4, the universal valve according to a preferred structural embodiment comprises a valve body 10 having axially aligned inlet and outlet ports 12 and 14 at opposite sides communicating respectively with inlet and outlet chambers 16 and 18 which are connected through the intermediate valve chamber 20 defined by the cylindrical bore 22. The bore 22 terminates in a shoulder or flange 24 and snugly receives a reversible valve seat member 26 having annular end recesses 28 and 30 adapted to respectively receive an O-ring 32 to provide a seal between the flange 24 and seat 26.

Valve seat member 26 is preferably a cylindrical ring that has an end wall 34 formed with a central aperture 36 that defines a fluid flow port in the valve between the inlet and intermediate chambers, fluid flow through which is controlled by a valve closure assembly 38.

Valve seat member 26 is retained within bore 22 by a hollow recessed cover member 40 threadedly secured within a bottom opening 42 of the body 10, with an O-ring 44 providing a static seal between the cover and body. When cover 40 is drawn tight it abuts seat 26 and forces it against shoulder 24, thereby compressing seal ring 32 around aperture 36. Cover 40 within the valve body has a plurality of equiangularly spaced side openings 46 through which fluid passes from intermediate chamber 20 to the outlet chamber 18.

Valve closure assembly 38 is mounted on the end of a stem 48 and comprises a ring 50 having an annular groove 52 containing a resilient O-ring 54 which is adapted to engage seat ring 26 immediately surrounding aperture 36 in closed condition. Ring 50 is mounted in axially fixed position on the reduced lower end 47 of stem 48 in abutting engagement with a stem flange 56 as by a screw 58. The diameter of stem flange 56 and the head of screw 58 are preferably sufficiently smaller than aperture 36 to pass therethrough during normal operation without engaging wall 34.

Stem 48 passes slidably upward through a central body bore 60 aligned with bore 22, the stem having a groove 62 receiving a resilient O-ring 64 providing a seal between stem 48 and bore 60.

Stem 48 is motivated by a pressure responsive flexible diaphragm 66 peripherally secured between body 10 and a spring actuator housing 68 by bolt assemblies 70. The upper end of stem 48 is reduced and threaded and passes through a diaphragm washer 72 seated on a stem shoulder 78, diaphragm 66, and a spring retainer washer 74, with a locking nut 76 maintaining the respective elements in assembled relationship.

A fluid pressure control chamber 80 is provided between valve body 10 and diaphragm 66 to receive suitable fluid pressure which will act on the underside of the diaphragm 66, and a spring chamber 82 is provided between the upper side of diaphragm 66 and spring housing 68 to enclose a suitable compression spring assembly 84 to place a biasing downward thrust on diaphragm 66.

Spring assembly 84 includes a spring 86 connected at one end to the spring washer 74 and at its other end to the spring button 88 having a generally conical recess 89 which is engaged by the conical end of an adjustment screw 90 rotatable in an upper threaded opening 92 in the spring housing 68. A locking nut 94 locks adjusting screw 90 against rotation on housing 68 after it has been properly adjusted, and a screw cover 96 is threaded onto housing 68 at 123 with a seal provided therebetween by an O-ring 98. The cover is locked in place on the housing by a conventional wire assembly 100 to prevent removal thereof and tampering with the adjusting screw 90. Housing 68 is provided with a threaded side opening 102 which in the embodiment of FIGS. 1 and 2 provides a vent for spring chamber 82.

Figure 2:
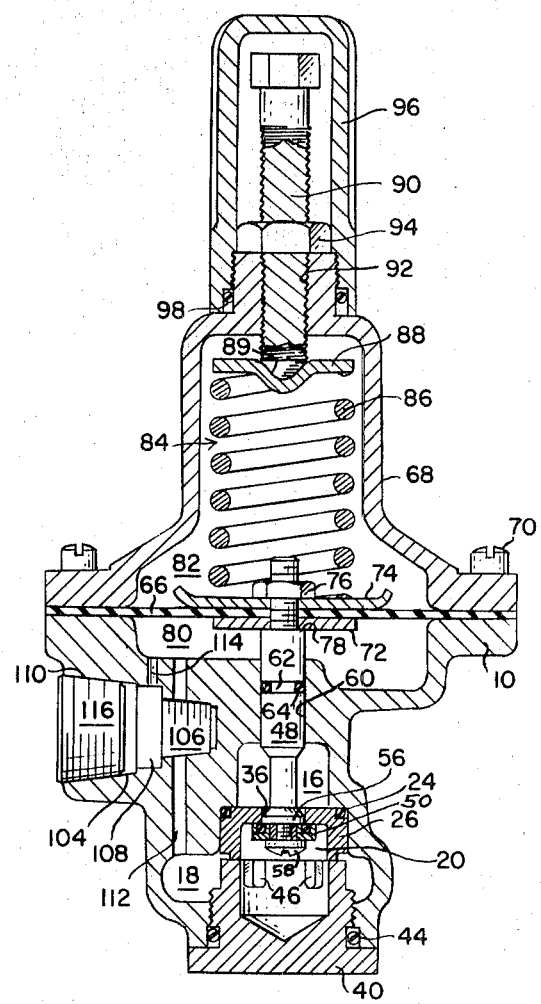
FIG. 2 is a partially sectioned elevation view substantially along line 2—2 of FIG. 1 illustrating suitable conduit means in the valve body for directing either fluid from the outlet of the valve or from an externally sensed source to the valve actuating member whereby the pressure of either the outlet fluid or the external fluid source may be controlled.

Referring now particularly to FIG. 2, valve body 10 has a side port 104 at right angles to ports 12 and 14 and having a reduced inner threaded section 106, an intermediate unthreaded section 108 and an enlarged outer threaded section 110. Inner section 106 intersects a fluid passageway 112 extending between outlet chamber 18 and control chamber 80. Similarly, a fluid passageway 114 connects bore section 108 directly to control chamber 80.

With the valve closure assembly 38 and the valve seat 26 relatively disposed as shown in FIGS. 1—4, the universal valve is especially adapted for use as a pressure reducing valve for controlling a downstream pressure either directly from outlet chamber 18 or from an external downstream conduit connection to port 104. A predetermined downward thrust is applied on diaphragm 66 to tend to hold closure assembly 38 in a normally open position, by suitably adjusting screw 90.

When it is desirable to control the outlet pressure from chamber 18, a threaded closure plug 116 is mounted in outer bore section 110 while inner bore section 106 maintains fluid communication between the chambers 18 and 80 through the unobstructed passageway 112 shown in FIG. 2. The force exerted by the pressure in control chamber 80 is so proportioned with respect to the force of spring 86 that they balance when closure 38 is displaced to open port 36 sufficiently to provide the desired pressure reduction. During operation diaphragm 66 will be raised and lowered in response to changes in fluid pressure in outlet chamber 18 to suitably vary flow of fluid through aperture 36 and thereby maintain the desired reduced fluid pressure in outlet chamber 18 and the pipeline downstream therefrom.

When it is desirable to maintain a reduced pressure downstream of the valve other than at a desired outlet chamber pressure, plug 116 is removed and a smaller diametered closure plug 118 (FIG. 3) is mounted in the inner bore section 106 to obstruct the fluid passageway 112 and prevent direct communication between outlet chamber 18 and control chamber 80. A suitable conduit 121 is then connected between outer bore section 110 and the fluid passage at the point to be controlled, and now control fluid pressure passes through bore sections 110 and 108 and passageway 114 into control chamber 80. The valve will then operate to maintain the downstream reduced pressure in the same manner as above.

Figure 3:
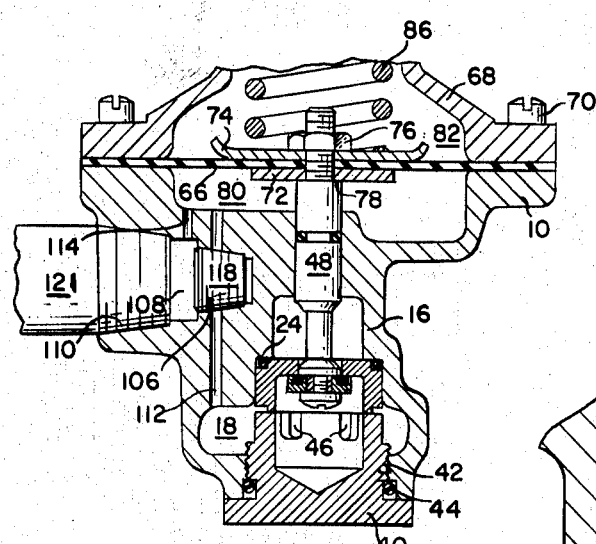
FIG. 3 is a fragmentary view similar to FIG. 2 showing the body conduit means respectively positioned for controlling the pressure of an external fluid source.
Figure 5:
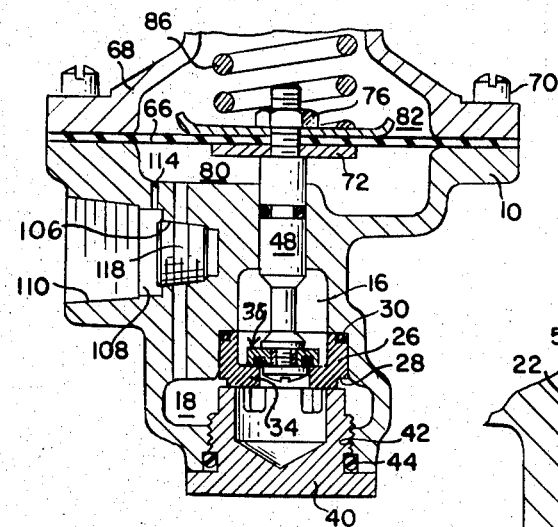
FIG. 5 is a partially sectioned view similar to FIG. 3, but illustrating the valve closure member assembly and cooperating body seat assembled to enable the valve to provide a back pressure or relief control function.
Figure 6:
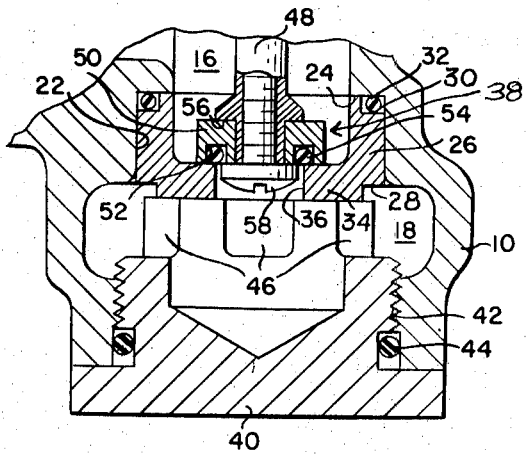
FIG. 6 is an enlarged fragmentary section of the closure member and seat assembly shown in FIG. 5.

Referring now to FIGS. 5 and 6, valve closure assembly 38 and seat ring 26 are reversed from the position shown in FIGS. 3 and 4 to provide a back pressure control or relief valve capable of controlling the upstream fluid line pressure. The pressure reducing valve of FIG. 3 is converted to the relief valve of FIG. 5 by first removing cover 40 and extracting screw 58 from the stem and removing ring 50. Seat 26 is extracted from bore 22 to allow replacement of seat 50 in a position reversed from its previous position as shown in FIG. 6. Ring 50 is retained in position by replacing screw 58. Seat 26 can now be replaced, inverted from its previous position as shown in FIG. 6 and retained by cover 40.

In this assembly, seat ring groove 52 faces downwardly and seat 26 has its end wall 34 facing downwardly. The O-ring 32 has now been shifted into the opposite end recess 30. When cover 40 is threaded onto the body it engages end wall 34 of the seat and forces the seat ring against shoulder 24 with O-ring 32 being compressed to seal around the periphery and prevent passage of fluid from inlet 16 to outlet 18 except through port 36. The head of screw 58 will merely pass within the seat opening 36 when the valve is closed as shown in FIG. 6. The valve will be normally closed by the initial thrust placed on diaphragm 66 by screw 90, this initial adjustment establishing the relief pressure at which the valve will open.

With plug 118 installed in inner bore section 106 as shown in FIG. 5, a suitable conduit may be connected to outer threaded bore section 110 to deliver upstream line pressure through intermediate section 108 and passageway 114 into control chamber 80. When the line pressure in chamber 80 acting on the underside of diaphragm 66 exceeds the preset relief pressure initially established by the proper setting of adjustment screw 90 acting through spring 86 on the top of diaphragm 66, the stem 48 and closure assembly 38 will be moved upwardly to open the valve and thereby relieve the upstream line fluid pressure until the predetermined set pressure is again established, and this continues until the spring and fluid pressure forces balance at the desired upstream pressure.

Figure 7:
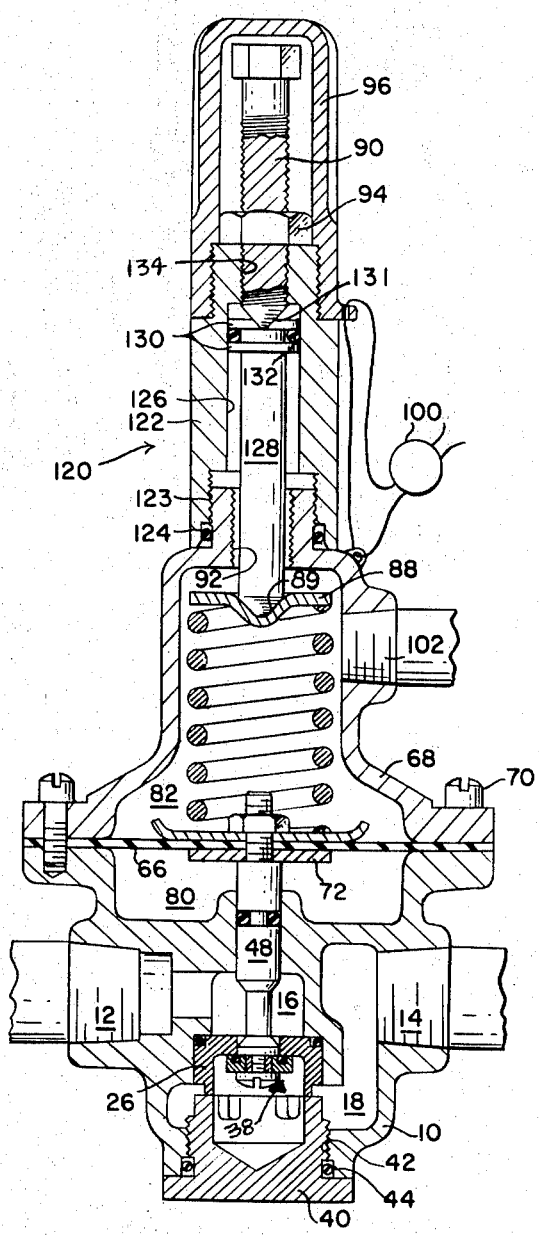
FIG. 7 is a partially sectioned view of a valve similar to that illustrated in FIG. 1, but further including structure enabling it to perform a pressure differential control function.

When it is desired to provide a differential pressure control valve, either the externally sensed pressure reducing valve illustrated in FIG. 3 or the relief valve shown in FIG. 5 may be readily converted to a differential pressure valve merely by adding an adjustment extension assembly 120 having a minimum number of parts to the spring actuator assembly. In FIG. 7, the pressure reducing valve of FIG. 3 is shown adapted for usage as a differential pressure reducing valve, with like numerals being applied to like parts.

The extension assembly 120 is interposed between spring housing 68 and adjustment screw 90 and comprises an extension housing 122 threadedly connected at 123 to the top of housing 68 and sealed thereagainst by O-ring 124, the housing 122 including a bore 126 within which a piston rod 128 freely moves, with the lower end of the rod extending through and spaced within the spring housing opening 92 and having a tapered end engaging the conical recess 89 of spring button 88. The upper end of the rod includes spaced annular piston flanges 130 which slidingly engage the wall of bore 126, with an O-ring 132 located between the flanges and providing a seal between the wall of bore 126 and the rod 128. The top flange 130 has a conical recess 131 engaged by the end of adjusting screw 90 which passes through the threaded extension housing opening 134 and is locked against rotation thereon by the locking nut 94. The adjusting screw cover 96 is then screwed onto the housing 122 and the antitampering wire assembly 100 tied in place.

Otherwise the valve parts are as disclosed in FIGS. 1—4.

In operation, the differential pressure signal can be applied across the diaphragm 66 by applying the higher of two sensed pressures to chamber 80 under the diaphragm in a manner similar to that described with respect to FIG. 3 and also by applying the lower of the two sensed pressures through the threaded aperture 102 by a suitable connecting conduit to the spring chamber 82 above the diaphragm. In this manner, with the valve components assembled as in FIG. 7 to perform a pressure reducing function, the valve closure assembly 38 will remain open as initially set by the adjustment of screw 90 urging the diaphragm 66 downwardly, until such time that the differential pressure between the fluids in chambers 80 and 82 acting across the diaphragm 66 can overcome the spring force in spring 86 initially established by the adjusting screw 90.

Similarly, if the valve closure assembly 38 and the seat 26 were assembled as in FIGS. 5 and 6 to provide a pressure relief function, the valve assembly 38 would remain closed until such time that the pressure differential across the diaphragm 66 exceeded the spring force.

Thus, it is seen that the basic pressure reducing and relief valve configurations illustrated in FIGS. 3 and 5, respectively are readily adaptable and convertible to a differential pressure control valve merely by adding the adjustment screw extension assembly 120 without changing or disturbing any of the other valve components.

When flow conditions exist that make it necessary to use a larger valve, the universal valve of the invention with its components arranged in any one of the configurations described above may be used as a pilot valve to control a larger main pilot operated valve. In this manner, the universal pilot valve will open or close to similarly cause the main valve to open or close, depending upon the type of operation desired.

Figure 8:
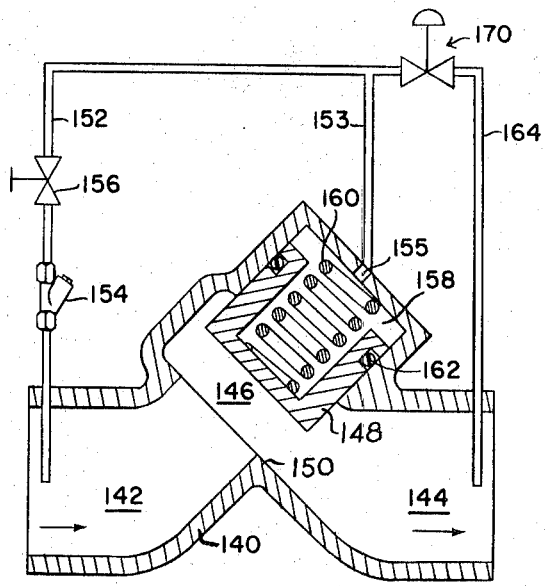
FIG. 8 is a partially sectioned schematic view of a valve arrangement illustrating the novel universal valve assembled as in any one of the configurations shown in FIGS. 1 through 7 and used as a pilot valve for controlling a standard pilot operated main valve.

With reference to FIG. 8, there is illustrated a fluid control system including a main valve body 140 having inlet and outlet ports 142, 144, respectively, intersecting a valve chamber 146 within which the valve closure piston 148 moves and cooperates with the valve seat 150 to control the flow of fluid therethrough.

A conduit line 152 conducts high-pressure inlet fluid from port 142 through a strainer 154 and needle valve 156 to conduit 153 connected to opening 155 at the base of a valve pressure chamber 158 formed behind the piston 148. A spring 160 is positioned in chamber 158 to bias the piston towards a normally closed position and O-ring 162 provides a seal between the external surface of the piston 148 and the wall of chamber 158. A conduit 164 connected to conduit 153 fluid communicates the pressure chamber 158 with the outlet port 144, with the universal pilot control valve 170 constructed according to any one of the above embodiments positioned in conduit 164 to control the flow of fluid therethrough.

When pilot valve 170 is closed, full upstream pressure from the valve inlet 142 builds up through conduits 152 and 153 and thus applies upstream pressure to control pressure chamber 158 to balance the fluid pressure equally on both sides of the main valve piston 148. When this occurs, the bias of spring 160 will cause the piston 148 to engage the valve seat 150 in the closed position.

When the pilot valve 170 is open, fluid flows from the valve inlet 142 to the outlet 144 through a strainer 154, a needle valve 156, conduit 152, pilot valve 170 and conduit 164. The flow of fluid through the needle valve 156 causes a pressure drop through the conduit 152 thus resulting in a corresponding lower control pressure in chamber 158 than the upstream pressure of inlet port 142. This fluid pressure difference applied across the piston 148 then overcomes the bias of spring 160 and opens the main valve by moving the piston 148 upwardly into the control chamber 158.

Thus, it is seen that the pilot valve 170 can be controlled to regulate the flow through the conduits 152 and 164 and thus regulate the pressure lost across the needle valve 156 which in turn controls the pressure in control chamber 158 to effect desired positioning of the piston valve 148.

If the components of the pilot valve 170 are arranged in a manner shown and described above with respect to FIG. 3, wherein valve closure assembly 38 is normally open, the main valve piston 148 will be maintained in a normally open position and will be used to throttle the flow through main valve 140 to produce a pressure reducing function.

Similarly, if the pilot valve 170 is constructed as shown in FIG. 5, main valve 140 will function as a pressure relief valve with its piston 148 normally closed and opening under control of the pilot valve to relieve the inlet pressure at port 142.

Likewise, if the pilot valve 170 is constructed as shown and described with respect to FIG. 7, the main valve 140 will operate as a pressure differential control valve corresponding to the pilot valve 170.

Thus, it is apparent that the pilot valve controlled system shown in FIG. 8 is readily adaptable to perform various fluid control functions without having to remove any of the system components, this conversion being accomplished simply by reassemblying the respective seat and closure assembly components of pilot valve 170 to any one of the desired configurations illustrated in FIGS. 1 and 3—7.

Accordingly, the novel universal control valve of the invention may advantageously be arranged to operate in various modes of control simply by proper assemblage of the respective individual components, thus eliminating the need for manufacturing and supplying a separate control valve for each desired mode of operation.

The components of the universal valve may be alternatively properly assembled to provide either a pressure reducing, pressure relief, and normally open or normally closed differential control function. The closure valve assembly and the body seat are easily removable and reversible to convert from one mode of assemblage to another to perform the desired mode of control operation. This conversion is accomplished without having to remove or reassemble any of the other valve components, especially the fluid pressure operated diaphragm and its associated spring assembly.

When the universal valve is large enough to handle the flow or pressure operating conditions, the valve itself can be used for the final control function. Additionally, when the operating conditions exceed the capacity of the universal valve, it can then be applied to control a larger valve and will function as a pilot for the larger valve which in turn will perform the desired flow or pressure control function.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a valve assembly wherein a body contains a valve seat opening disposed between inlet and outlet ports and a pressure responsive valve member associated with said opening to control flow of fluid therethrough, a pressure responsive element connected to actuate said valve member and having one side exposed to a control chamber within said body, a further port in said body comprising an outer section having means for attaching a control fluid pressure conduit or for mounting a closure device, and an inner section, control passage means within the body connecting said outlet passage with said control chamber through said inner section, and means for mounting a device in said inner section to close said passage means when a control fluid pressure conduit is connected to said outer section.

2. In a valve assembly defined in claim 1, said further port also comprising an intermediate section, and further control passage means connecting said intermediate section to the control chamber when a closure device is mounted in said inner section.

3. In a valve assembly wherein a body contains a valve seat opening disposed between inlet and outlet ports and a pressure responsive valve member associated with said opening to control flow of fluid therethrough, a pressure responsive element connected to actuate said valve member and having its opposite sides exposed to first and second control chambers respectively within said body, a first further port in said body connected by a passage to said first chamber and having means for attaching a first control fluid pressure conduit or for mounting a closure device, a second further port in said body adapted to connect a second control fluid pressure to said second chamber whereby said fluid pressure responsive element may be responsive to the differential of said control fluid pressures, control passage means within the body connecting said outlet with said first control chamber, and means for removably mounting a device in said control passage means to close said control passage means and prevent the application of outlet pressure to said first control chamber when differential control fluid pressures are connected to actuate said fluid pressure responsive element.

4. A pilot-operated control valve system comprising a main valve including a body having inlet and outlet ports intersecting a valve chamber, closure means mounted in said valve chamber and having a seating surface cooperating with a body seat formed at the intersection of said inlet port and valve chamber to control the fluid flow therebetween, actuating means acting against a rear surface of and biasing said closure member to a closed position, first conduit means connecting said inlet port with a pressure chamber at said valve chamber to apply fluid pressure against said rear surface, second conduit means connecting said pressure chamber with said outlet port, a pilot valve connected in said second conduit means, said pilot valve comprising a pilot body having a pilot valve chamber, reversible seat means positioned in said valve chamber and having opening means through which fluid passes through said pilot body, a stem having one end positioned for movement in said pilot valve chamber and its other end extending outwardly of said pilot body, a reversible valve closure assembly removably mounted on said one stem end and operable to control the fluid flow through said seat opening means, and resilient means connected to said other stem end and operative to bias said valve closure assembly to a normally open or normally closed position depending upon the cooperative assemblage of said reversible seat and reversible valve closure assembly.

5. A universal control valve comprising a main body having means defining fluid inlet and outlet passages intersecting a valve chamber, reversible seat means positioned in said valve chamber and having an opening communicating with said inlet and outlet passages, means defining a fixed substantially annular surface in said main body, said reversible seat means being adapted to abut said surface in either of its reversed positions, a stem having one end positioned for movement in said valve chamber and its other end extending outwardly of said main body, a reversible valve closure assembly removably mounted on said one stem end and operable to control the fluid flow through said seat opening, pressure-actuated means connected to said other stem end and operable to move said valve closure assembly between open and closed positions, means providing an access opening in said body, said access opening being so disposed and of such size that said reversible seat means may be inserted or withdrawn therethrough, a cover member removably mounted over said access opening, and means on said cover projecting to engage and hold said reversible seat means in either of its reversed positions.

6. In the universal control valve defined in claim 5, said surface being provided as a shoulder in a recess within the body, in which recess said reversible seat is slidably inserted in both of its reversed positions.

7. A universal control valve comprising a body having means defining fluid inlet and outlet passages intersecting a valve chamber, reversible seat means positioned in said valve chamber and having an opening communicating with said inlet and outlet passages, a stem having one end positioned for movement in said valve chamber and its other end extending outwardly of said body, a reversible valve closure assembly removably mounted on said one stem end and operable to control the fluid flow through said seat opening, pressure-actuated means connected to said other stem end and operable to move said valve closure assembly between open and closed positions, whereby when said seat and valve closure assembly are positioned in a first corresponding cooperating assemblage said valve may act as a normally open pressure-reducing valve and when in another cooperating assemblage said valve may act as a normally closed pressure relief valve, said pressure-actuated means comprising an actuator housing mounted on said body and separated therefrom by a pressure responsive flexible diaphragm to which said other stem end is connected, said diaphragm and valve body defining a pressure chamber therebetween and said diaphragm and actuator housing defining an actuator chamber therebetween, actuator means in said actuator chamber to apply a predetermined thrust on said diaphragm to maintain said valve closure assembly in said normally open or normally closed position, and fluid passage means in said valve body for conducting the fluid to be controlled to said fluid pressure control chamber, whereby said diaphragm responds to said fluid pressure to position said valve closure assembly, said fluid passage means including a first passageway connecting said outlet passage with said fluid pressure chamber and a second passageway adapted to connect an external fluid source with said fluid pressure chamber, and removable plug means for selectively preventing fluid flow through one of said passageways when it is desired to control the pressure of fluid flowing through the other passageway.

8. The universal control valve of claim 7, said actuator means comprising spring means connected at one end to said diaphragm, and adjusting means mounted on said actuator housing and engaging the other end of said spring means, said adjusting means being effective to adjust the bias of said spring means and thereby adjust the predetermined thrust applied to said diaphragm to place said valve closure assembly in said normally open or normally closed position.

9. The universal control valve of claim 8, said adjusting means comprising screw means threaded through an opening in said actuator housing with its end engaging the other end of said spring means.

10. A universal control valve comprising a body having means defining fluid inlet and outlet passages intersecting a valve chamber, reversible seat means positioned in said valve chamber and having an opening communicating with said inlet and outlet passages, a stem having one end positioned for movement in said valve chamber and its other end extending outwardly of said body, a reversible valve closure assembly removably mounted on said one stem end and operable to control the fluid flow through said seat opening, pressure-actuated means connected to said other stem end and operable to move said valve closure assembly between open and closed positions, whereby when said seat and valve closure assembly are positioned in a first corresponding cooperating assemblage said valve may act as a normally open pressure-reducing valve and when in another cooperating assemblage said valve may act as a normally closed pressure relief valve, said pressure-actuated means comprising an actuator housing mounted on said body and separated therefrom by a pressure responsive flexible diaphragm to which said other stem end is connected, said diaphragm and valve body defining a pressure chamber therebetween and said diaphragm and actuator housing defining an actuator chamber therebetween, actuator means in said actuator chamber to apply a predetermined thrust on said diaphragm to maintain said valve closure assembly in said normally open or normally closed position, fluid passage means in said valve body for conducting the fluid to be controlled to said fluid pressure control chamber, whereby said diaphragm responds to said fluid pressure to position said valve closure assembly, said actuator means comprising spring means connected to one end to said diaphragm, adjusting means mounted on said actuator housing and engaging the other end of said spring means, said adjusting means being effective to adjust the bias of said spring means and thereby adjust the predetermined thrust applied to said diaphragm to place said valve closure assembly in said normally open or normally closed position, and said adjusting means comprising an extension housing connected to said actuator housing with sealing means therebetween, an extension rod having one end engaging said spring means and the other end extending outwardly through said actuator housing and into a bore in said extension housing and being movable therein, sealing means between said rod and the wall of said bore, adjusting screw means passing through said extension housing and engaging the other end of said rod, whereby the bias of said spring means is adjusted by adjustment of said screw means and said extension rod, and an aperture in said actuator housing for supplying fluid pressure to said actuator chamber so that said valve may act as a pressure differential control valve in response to the pressure differential across said diaphragm.

11. A universal control valve comprising a body having means defining fluid inlet and outlet passages intersecting a valve chamber, reversible seat means positioned in said valve chamber and having an opening communicating with said inlet and outlet passages, a stem having one end positioned for movement in said valve chamber and its other end extending outwardly of said body, a reversible valve closure assembly removably mounted on said one stem end and operable to control the fluid flow through said seat opening, pressure-actuated means connected to said other stem end and operable to move said valve closure assembly between open and closed positions, whereby when said seat and valve closure assembly are positioned in a first corresponding cooperating assemblage said valve may act as a normally open pressure-reducing valve and when in another cooperating assemblage said valve may act as a normally closed pressure relief valve, said reversible seat means being received in a bore in said body and retained therein by removable cover means connected to said body, said valve closure assembly including a sealing member received in a retainer ring reversibly mountable on said one stem end, and removable means holding said ring on said one stem end and permitting ready removal and reversal thereof to change the operating control function of said valve.